United States Patent
Dietz

(10) Patent No.: US 11,898,101 B2
(45) Date of Patent: Feb. 13, 2024

(54) METHOD AND APPARATUS FOR CONTINUOUS PRODUCTION OF MESOPHASE PITCH

(71) Applicant: Koppers Delaware, Inc., Pittsburgh, PA (US)

(72) Inventor: James T. Dietz, Sewickley, PA (US)

(73) Assignee: Koppers Delaware, Inc., Pittsburgh, PA (US)

( * ) Notice: Subject to any disclaimer, the term of this patent is extended or adjusted under 35 U.S.C. 154(b) by 0 days.

(21) Appl. No.: 17/300,591

(22) Filed: Aug. 26, 2021

(65) Prior Publication Data

US 2023/0062059 A1     Mar. 2, 2023

(51) Int. Cl.
| | | |
|---|---|---|
| B01J 19/00 | (2006.01) | |
| C10C 3/02 | (2006.01) | |
| C10C 3/00 | (2006.01) | |
| B01J 19/18 | (2006.01) | |

(52) U.S. Cl.
CPC .............. *C10C 3/02* (2013.01); *B01J 19/006* (2013.01); *B01J 19/0013* (2013.01); *B01J 19/1812* (2013.01); *C10C 3/002* (2013.01); B01J 2219/00159 (2013.01); B01J 2219/00763 (2013.01); B01J 2219/185 (2013.01)

(58) Field of Classification Search
CPC ........ C10C 3/002; C10C 3/02; B01J 19/0013; B01J 19/006; B01J 19/1812; B01J 2219/00763; B01J 2219/185; B01J 2219/00159

See application file for complete search history.

(56) References Cited

U.S. PATENT DOCUMENTS

| | | |
|---|---|---|
| 4,017,327 A | 4/1977 | Lewis et al. |
| 4,208,267 A | 6/1980 | Diefendorf et al. |
| 4,209,500 A | 6/1980 | Chwastiak |
| 4,283,269 A | 8/1981 | Greenwood |
| 4,457,828 A | 7/1984 | Lewis |
| 4,512,874 A | 4/1985 | Watanabe |
| 4,533,461 A | 8/1985 | Izumi et al. |
| 4,534,850 A | 8/1985 | Izumi et al. |
| 4,591,424 A | 5/1986 | Gomi et al. |
| 4,596,652 A | 6/1986 | Shibatani et al. |
| 4,715,945 A | 12/1987 | Dickakian |
| 4,891,126 A | 1/1990 | Mochida et al. |
| 4,986,893 A | 1/1991 | Seo et al. |
| 5,182,010 A | 1/1993 | Mochida et al. |

(Continued)

FOREIGN PATENT DOCUMENTS

| | | |
|---|---|---|
| CN | 111944552 A | 11/2020 |
| EP | 0 054 437 | 6/1982 |

(Continued)

*Primary Examiner* — Prem C Singh
*Assistant Examiner* — Brandi M Doyle
(74) *Attorney, Agent, or Firm* — K&L Gates LLP

(57) ABSTRACT

A process and apparatus for the continuous conversion of isotropic carbonaceous materials into anisotropic mesophase pitch is disclosed. The invention disclosed herein addresses the need for lower production costs compared with traditional batch mesophase conversion of isotropic pitch. A unique thermal processing and in-process separation of reacted mesophase from the continuous matrix of fresh or partially reacted isotropic pitch is provided. Potential uses are for further continuous processing into carbon fibers or carbon form densification.

18 Claims, 2 Drawing Sheets

(56) References Cited

U.S. PATENT DOCUMENTS

| | | | |
|---|---|---|---|
| 5,494,567 | A | 2/1996 | Tamaki |
| 9,222,027 | B1 | 12/2015 | Malone et al. |
| 9,376,626 | B1 | 6/2016 | Malone et al. |
| 10,731,084 | B1 | 8/2020 | Malone et al. |
| 2002/0010364 | A1 | 1/2002 | Brathwaite et al. |

FOREIGN PATENT DOCUMENTS

| | | |
|---|---|---|
| EP | 0 257 303 | 3/1988 |
| EP | 0 838 515 | 4/1998 |
| WO | 96/14369 | 5/1996 |

METHOD AND APPARATUS FOR CONTINUOUS PRODUCTION OF MESOPHASE PITCH

BACKGROUND OF THE INVENTION

1. Field of the Invention

The present invention relates to a method and apparatus for continuous production of mesophase pitch. More specifically, it relates to a process and apparatus which utilizes a single reaction vessel with at least two temperature zones which creates a reaction in an upper temperature zone to form mesophase pitch from isotropic pitch, separates mesophase pitch to a lower temperature zone and recycles unreacted isotropic pitch back to the upper temperature zone for further reaction.

2. Description of the Prior Art

Liquids from carbonaceous materials that do not flow under room conditions are referred to as pitches. Pitches that appear as a continuous phase even with dispersed solids are referred to as isotropic pitch. The present invention pertains to an improved process for the conversion of isotropic pitch to mesophase pitch. Mesophase pitch is defined as a pitch with higher molecular weight regimes to the point where it is no longer soluble in the continuous isotropic phase. FIG. 1 shows a photomicrograph under polarized light of round mesophase nematic liquid crystal domains in a continuous isotropic pitch. This figure was taken from Zenodo, 10 Aug. 2019, DOI: 10.5281/zenodo.3365347.

As mesophase domains build, they can coalesce into larger domains. The percentage of a given area that is comprised of mesophase domains is defined as the percentage of mesophase.

Mesophase pitch can be used to spin carbon fibers, densify carbon artifacts and in additive manufacturing. During pitch-based fiber production, the freshly-spun, or green, fiber must be oxidized prior to carbonization and graphitization so as not to melt. Oxidation temperatures of more than 200 degrees Celsius requires a fiber precursor that does not melt in oxidation. Mesophase pitch has a softening point temperature typically between 275 and 350 degrees Celsius which is sufficiently above that required to oxidize the fibers and avoiding reliquefying them.

The disclosed invention can be used to feed a continuous pitch-based carbon line. Currently no continuous process for producing mesophase pitch from carbonaceous precursors such as coal tar or petroleum-based pitches exists in a commercial application. To date all production of mesophase pitch is done by a few select practitioners in a batch-style of reaction where there is no continuous flow of precursor into and mesophase product out of a reaction system.

In preparation of this disclosure a number of technical articles and patents were reviewed. Such references will be set forth in applicants Information Disclosure Statement when filed.

Prior art is generally broken into two broad categories: 1) making mesophase pitch and 2) making carbon fibers from mesophase pitch. The conversion of raw materials into isotropic pitch, where isotropic pitch was not the raw material, is largely only a transitional phase of the reaction to mesophase pitch.

Early work by Union Carbide's Irwin Lewis and E. R McHenry as well as others recognized that mesophase pitch for use in carbon fibers, whether prepared thermally or chemically cross-linked, needed to have a specific molecular weight range of about 1000 (U.S. Pat. No. 4,017,327, "Process for Producing Mesophase Pitch", Irwin Lewis, et al, Assignee: Union Carbide Corporation, Apr. 12, 1977). Too low of a MW, the yield and stabilization of the fiber will not stand up through carbonization. Too high of a MW, the fiber will be too brittle to spin.

Diefendorf and Riggs of Exxon (U.S. Pat. No. 4,208,267, "Forming Optically Anisotropic Pitches", Russell J. Diefendorf and Dennis M. Riggs, Assignee: Exxon Research and Engineering Company, Jun. 17, 1980) investigated conversion of isotropic pitch into mesophase pitch having a substantial solubility in benzene, pyridine and quinoline. The insoluble portion was spun to produce stable fibers.

Stephen Chwastiak of Union Carbide (U.S. Pat. No. 4,209,500, "Low Molecular Weight Mesophase Pitch", Stephen Chwastiak, Assignee: Union Carbide Corporation, Jun. 24, 1980) introduced making mesophase pitch by agitating and blowing with inert gas with the concept of a sparging constant in terms of the volumetric rate per mass of pitch.

Sydney Greenwood of Exxon (U.S. Pat. No. 4,283,269, "Process for the Production of a Feedstock for Carbon Artifact Manufacture", Sydney Greenwood, Assignee: Exxon Research and Engineering Company, Aug. 11, 1981) offers an earlier continuous process description by using a method of solvent fluxing and subsequently thermally treating mesophase pitch. The solvent is removed by an antisolvent and reused. The pitch is then a high softening point ready for use in making carbon artifacts.

Many advances in using coal tar distillates as raw materials were made by Mitsubishi Gas Chemical Company, Ltd. Most notably, inventions by Isao Mochida with alkylated naphthalene and Haruo Shibatani and Kunimasa Takahashi for thermal conversion of ethylene cracker bottoms with a hydrogen donor solvent. Mochida's work was the predecessor of the well-known Mitsubishi AR mesophase pitch. Ikuo Seo of Kureha Kagaku Kogyo Kabushiki Kaisha Company, today Kureha Group makers of Kreka petroleum pitch-based carbon fibers, used naphthalene with hydrofluoric acid and boron trifloride to make spinnable fibers.

In 1985, Masami Watanabe of Kashima Oil patented a method of continuously making mesophase pitch (U.S. Pat. No. 4,512,874, "Method for Producing Mesophase Pitch Continuously", Masami Watanabe, Assignee: Kashima Oil Co. Ltd., Apr. 23, 1985) using a separate vessel for gravity settling mesophase based on its higher density than isotropic pitch. In this configuration maintaining the interconnecting conduits free from losing temperature and "freezing" the high softening point mesophase pitch without further reacting the liquid to solid carbon.

In general, systems to produce mesophase pitch by using Lewis acids are expensive to build and operated given the extremely corrosive environment. Other systems employing the use of solvent fractionation, require multiple extractions and solvent recovery and recycle steps that are expensive to construct and inefficient from an energy perspective.

More recently, Advanced Carbon Products, LLC (Hitchins, KY) has received three US patents in continuous pitch processing. U.S. Pat. No. 9,222,027, "Single Stage Pitch Process and Product", outlines a process to make isotropic pitch in a long, high velocity tubular reactor with a residence time less than 10 seconds. U.S. Pat. No. 9,376, 626, "Turbulent Mesophase Pitch Process and Products", uses a long, high velocity tubular reactor to convert isotropic pitch to mesophase pitch. U.S. Pat. No. 10,731,084 B1 "Pitch Process" appears to combine both of the prior patents into an integrated process. In each case the reactors are heated by electric conduction, direct-fired furnace, or molten baths of metal or salts.

SUMMARY OF THE INVENTION

In accordance with the present invention the conversion of isotropic pitch can occur under temperature necessary to thermally crack the carbonaceous liquid isotropic pitch feed that subsequently forms larger, higher molecular weight molecule through poly condensation reactions. These reactions progress until the molecular weight portion transforms into small separate phase regions called mesogens that can grow into larger domains. The present invention provides for an apparatus that can both thermally react and separate the mesogen formation, returning the untransformed isotropic pitch for further reaction. As the mesophase pitch is continuously discharged, new isotropic pitch is continuously fed into the reactor.

In its simplest form, an apparatus for continuous production of mesophase pitch is provided which comprises: a generally cylindrical reactor vessel having an outer vessel wall, a top end and a bottom end, said vessel having an upper controlled temperature zone and a lower controlled temperature zone; a reactor head mounted on said top end of the vessel; a cylindrical tube baffle centered and mounted along said central axis of said vessel and spaced inwardly from said outer vessel wall; an inlet for feeding isotropic pitch into the upper controlled temperature zone; flow control means for circulating fluid in said vessel downwardly inside said tube baffle and upwardly outside said tube baffle; a mesophase separator located between said upper temperature zone and said lower temperature zone; a first heating element for heating said upper temperature zone; a second heating element for heating said lower temperature zone; and an outlet for providing mesophase pitch for further processing.

Preferably, the flow control means comprises a mechanical agitator powered by a motor. The mechanical agitator preferably further comprises an axial flow impeller at a top and bottom of said tube baffle to promote liquid flow down through tube baffle and high-shear impellers mounted between the axial flow impellers to promote dispersion of mesogens that shear into smaller domains as well as backmixing of the isotropic pitch feed.

Preferably, the flow control means also comprises at least one sparge ring to dispense an inert gas to promote upward flow and collect lower molecular weight molecules that are the products of thermal cracking but do not take part in a subsequent polycondensation reaction.

Preferably the inlet to the vessel inlet is located near said top end of said vessel wall inlet has a branch line to feed isotropic pitch to a second reactor vessel in parallel to said vessel. Many vessels in parallel can be added in this fashion.

Preferably, the reactor head is flanged for inspection, cleaning and maintenance. Further it is preferred that the bottom end of outer vessel wall has a conical bottom in which said lower temperature zone is located. This conical bottom is also preferably flanged for inspection, cleaning and maintenance. The conical bottom is designed so that higher density mesophase domain shed off said mesophase separator and accumulate in a conical bottom of said vessel. Preferably, the outlet is provided in the bottom of said conical bottom of said vessel.

Preferably, said heating element for said upper temperature zone and said heating element for said lower temperature zone is selected from the group comprising contact resistance heaters, induction heaters and molten salt or metal when an external jacket is employed. The said upper temperature zone is maintained at a temperature necessary to maintain reaction conditions and said lower temperature zone is maintained at a temperature below that necessary to maintain reaction conditions by above that necessary to maintain mesophase pitch in a liquid state. One or more additional temperature zones, each with separately controlled heating elements, may be added to control reaction conditions more precisely. A transfer pump is preferably provided to promote mesophase pitch to exit said outlet. Alternatively, mesophase pitch may exit said outlet by reactor operating pressure.

Preferably, said flow control means continuously cycles unreacted isotropic pitch which reaches the lower temperature zone back to said upper temperature zone for further reaction.

A method for continuous production of mesophase pitch is also provided which comprises the steps of: feeding isotropic pitch into an upper temperature zone of a vessel; heating and maintain said upper temperature zone to a reaction temperature needed to produce mesophase pitch from said isotropic pitch; allowing said mesophase pitch to drop into a lower temperature zone of a vessel and separating said mesophase pitch from unreacted isotropic pitch; cycling unreacted isotropic pitch which reaches said lower temperature zone back to said upper temperature zone for further reaction; maintaining the temperature of said lower temperature zone into which the mesophase pitch has dropped below a reaction temperature and above a temperature needed to maintain the mesophase pitch in a liquid state; and removing mesophase pitch from the vessel for further processing.

DETAILED DESCRIPTION OF THE PREFERRED EMBODIMENTS

The process as described herein comprises a reactor and its feed, product, inert gas, vapor handling and instrumentation systems for the conversion of isotropic pitch from carbonaceous sources into mesophase pitch. Carbonaceous sources include, but are limited to, those derived from coal by high temperature metallurgical coke production, coal liquefaction or coal gasification, petroleum sources and other high molecular weight organic liquids.

Figure 1:
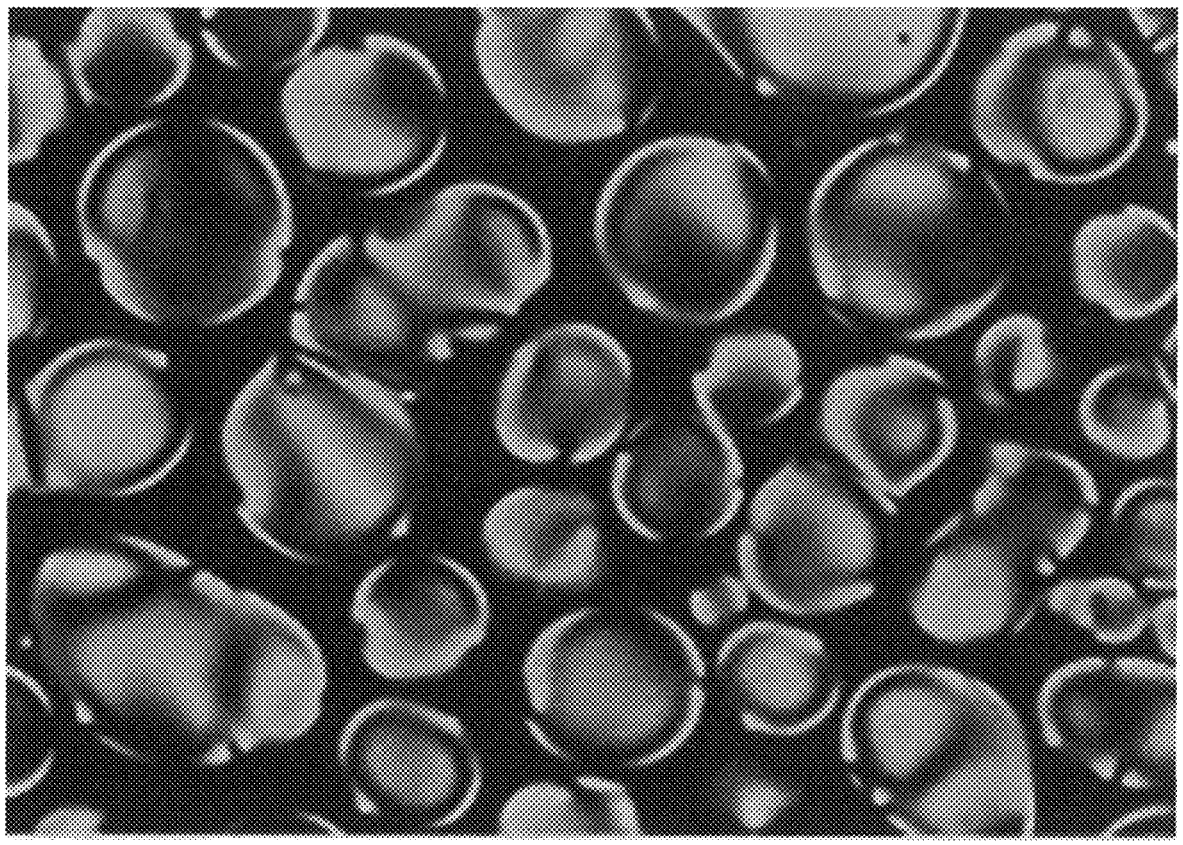
FIG. 1 is a photomicrograph under polarized light showing round mesophase nematic liquid crystal domains in a continuous isotropic pitch.
Figure 2:
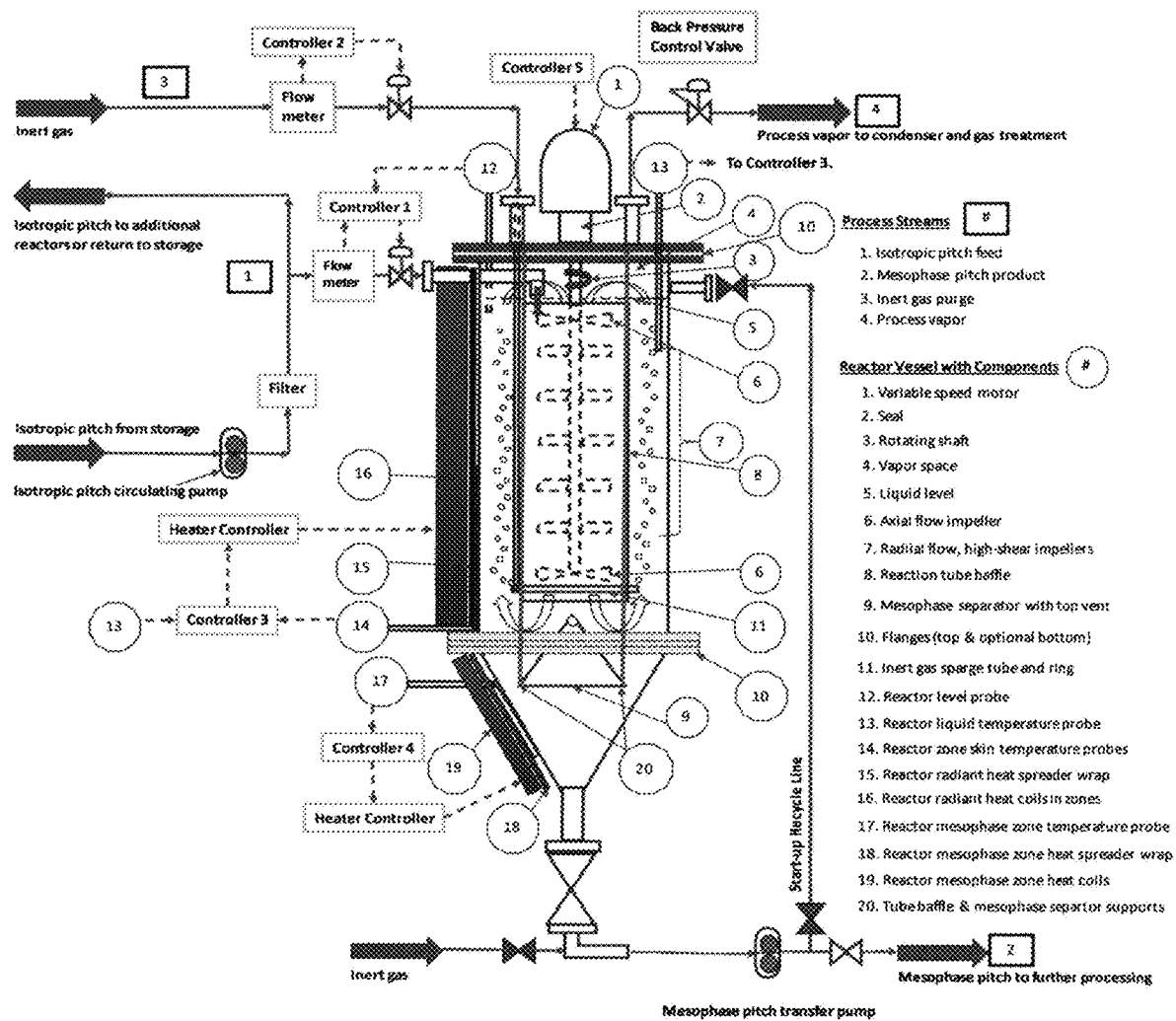
FIG. 2 is a schematic diagram showing the method and apparatus of the present invention.

Referring to FIG. 1, isotropic pitch stream 1 is circulated from an intermediate storage tank or process vessel with a pump through an in-line filter(s) to the reactor feed take-off to the reactor. The feed stream further supplies additional reactors in a larger multi-reactor facility and then returns the excess isotropic pitch to the intermediate storage tank or vessel. As required, a back pressure control valve or orifice restriction is installed to provide the appropriate pressure to feed the reactor system.

The reactor feed rate is controlled as measured by the feed flow meter. The reactor product is removed at a constant rate so the reactor level instrument (12), will set the feed rate into the reactor. The reactor is comprised of an external vessel of a size and construction that is required by the carbonaceous material to be converted and its reaction process conditions. Reaction temperatures are typically 300 to 500 degrees Celsius, and pressures are typically less than 5 bar gage. This coupled with reactor residence times of typically less than six hours make the vessel economical to construct and install. The reactor head and optionally the bottom cone are typically flanged (10) for inspection, cleaning and maintenance.

Internal to the reactor is a mechanical agitator driven by a motor (1) using AC or DC electric current, hydraulic or pneumatic energy. The motor can be magnetically coupled to the agitator shaft or has a seal that is packed or mechanical to prevent the escape of the reactor process vapor (4). The agitator sits inside a tube baffle (8) whose dimensions are set by the size of the reactor. The agitator blades, or impellers, have an axial flow impeller (6) at the top and bottom to promote liquid flow down through the tube baffle and upward on the outside of the tube baffle. There are high-shear impellers (7) between the axial flow impellers. This promotes dispersion of mesogens that shear into smaller domains as well as back-mixing of the isotropic pitch feed. The motor can be variable speed to adjust the rate at which the reacting liquid is circulated downward through the tube baffle and upwards on its exterior surface.

The internal reactor flow exits the tube baffle and impacts an internal cone mesophase separator (9). Both the tube baffle and mesophase separator are affixed to the vessel's top flange for stability and ease of removal for maintenance. The higher density mesophase domains shed off the cone and accumulate in the conical bottom section of the reactor under the conical separator. The continuous phase isotropic pitch turns upward on the outside of the tube baffle. Inert gas (3) is released on the outside at the tube baffle's base using a sparge ring (11) to promote upward flow and vaporization, or "stripping", the lower molecular weight molecules that are products of the thermal cracking but do not take part in the subsequent polycondensation reaction. The inert gas flow is controlled to optimize this light vapor stripping without overcooling or disturbing the heat transfer efficiency from the reactor shell. The inert gas may be externally preheated so as not create a region of high liquid viscosity upon its exit from the sparge ring. Oils in the vapor are condensed and the non-condensable gas is appropriately treated. The rising liquid is heated as described below and re-enters the top of the tube baffle where is combines with fresh isotropic pitch feed. Maintaining an even reaction zone temperature is key to controlling the extent of the reaction.

The reactor is heated externally by a means that can provide the energy necessary to reach reaction conditions. In this example exterior radiant heat is used but this could also be contact resistance heaters, induction heating or molten salt or metal when an external jacket has been employed. It is essential that the method of heating be closely controlled so as not to provide an area that is overheated by developing hot spots. Hot spots can lead to over-reaction and coking. The spacing between the tube baffle and the internal vessel wall in conjunction with the agitator design will provide sufficient upward liquid velocity to meet the required heat transfer efficiency to prevent overheating.

As shown in FIG. 1, at least two zones of heating are employed. Depending on the length of the reactor, more zones can be employed with individual controls. In FIG. 1 with radiant heating mantles (16), the temperature of the exterior shell, or skin, of the reactor is controlled. The temperature of the skin is controlled by one or more exterior temperature measurement device(s) or probes (14). To ensure efficient heat distribution around the shell, a reactor heat spreader wrap (15) holds the probe in place against the reactor exterior skin. The heating mantle is insulated to prevent the outward loss of heat. Each heating zone temperature is set by the internal reactor liquid temperature measure by another probe (13).

The conical bottom of the reactor is separately temperature controlled at a lower temperature to cease further reaction of its contents while remaining above the mesophase pitch softening point. This has a separate skin temperature probe (17), heat spreader wrap (18) and exterior heating coils or mantle (19). The setpoint of this temperature zone is 20 to 50 degrees Celsius below the controlled reaction conditions.

Mesophase pitch is removed from the reactor by a transfer pump or, alternatively, by the reactor operating pressure, for further processing such as carbon fiber spinning, carbon artifact densification or solidification for sale and transport. Alternatively, during equipment start-up, shutdown or a pause in forward feeding the mesophase pitch can be returned to the reactor where it mixes with the reactor liquid contents. In the case of starting the system, the precursor will be recirculated until the reaction progresses.

It is to be understood that while certain forms of the present invention have been illustrated and described herein, the present invention is not to be limited to the specific forms or arrangements of parts described and shown.

I claim:

1. An apparatus for continuous production of mesophase pitch comprising:
    a generally cylindrical reactor vessel having an outer vessel wall, a top end and a bottom end, said vessel having an upper temperature zone and a lower temperature zone;
    a reactor head mounted on said top end of said vessel;
    a cylindrical tube baffle centered and mounted along a central axis of said vessel and spaced inwardly from said outer vessel wall forming (i) an inside space within said cylindrical tube baffle, (ii) an outside space between said cylindrical tube baffle and said outer vessel wall and (iii) a circulation path through said inside space and said outside space;
    an inlet for feeding isotropic pitch into the upper temperature zone;
    an agitator for circulating fluid along said circulation path in said vessel through said inside space and said outside space;
    a mesophase separator located between said upper temperature zone and said lower temperature zone;
    a first heating element for heating said upper temperature zone;
    a second heating element for heating said lower temperature zone; and
    an outlet for providing mesophase pitch for further processing.

2. An apparatus for continuous production of mesophase pitch according to claim 1 wherein said agitator is powered by a motor.

3. An apparatus for continuous production of mesophase pitch according to claim 1 wherein said agitator further comprises at least one axial flow impeller at an end of said inside space and at least one high-shear impeller within said inside space.

4. An apparatus for continuous production of mesophase pitch according to claim 1 further comprising at least one sparge ring to dispense an inert gas in a direction of fluid flow within said outside space.

5. An apparatus for continuous production of mesophase pitch according to claim 1 wherein said inlet further comprises a branch line to feed isotropic pitch to a second reactor vessel in parallel to said vessel.

6. An apparatus for continuous production of mesophase pitch according to claim 1 wherein said reactor head is flanged.

7. An apparatus for continuous production of mesophase pitch according to claim 1 wherein said bottom end of said outer vessel wall further comprises a conical bottom in which said lower temperature zone is located.

8. An apparatus for continuous production of mesophase pitch according to claim 7 wherein said conical bottom is flanged.

9. An apparatus for continuous production of mesophase pitch according to claim 8 wherein higher density mesophase material accumulates in said conical bottom of said vessel.

10. An apparatus for continuous production of mesophase pitch according to claim 7 wherein said outlet is located in said conical bottom of said vessel.

11. An apparatus for continuous production of mesophase pitch according to claim 1 wherein said first and second heating elements are selected from the group consisting of radiant heaters, contact resistance heaters, induction heaters and molten salt or metal when an external jacket is employed.

12. An apparatus for continuous production of mesophase pitch according to claim 1 wherein said first heating element is configured to maintain said upper temperature zone at a temperature necessary to maintain reaction conditions.

13. An apparatus for continuous production of mesophase pitch according to claim 1 wherein said second heating element is configured to maintain said lower temperature zone at a temperature below that necessary to maintain reaction conditions but above that necessary to maintain mesophase pitch in a liquid state.

14. An apparatus for continuous production of mesophase pitch according to claim 1 further comprising one or more additional temperature zones to control reaction conditions more precisely.

15. An apparatus for continuous production of mesophase pitch according to claim 1 further comprising a transfer pump to extract mesophase pitch from said outlet.

16. An apparatus for continuous production of mesophase pitch according to claim 1 wherein mesophase pitch exits said outlet by reactor operating pressure.

17. An apparatus for continuous production of mesophase pitch according to claim 4 wherein at least one of said sparge ring and said agitator continuously circulates fluid including unreacted isotropic pitch from said lower temperature zone back to said upper temperature zone for further reaction.

18. An apparatus for continuous production of mesophase pitch according to claim 1 wherein said inlet is located near said top end of said outer vessel wall.

\* \* \* \* \*